3 Sheets—Sheet 1.

W. H. FIELD.

Nail-Plate Feeder.

No. 8,556. Reissued Jan. 28, 1879

Witnesses
Frd G. Dieterich
Jno. P. Brooks.

Inventor
Wm. H. Field,
pr. C. A. Snow & Co.
attorneys

N. PETERS, PHOTO-LITHOGRAPHER, WASHINGTON, D. C.

3 Sheets—Sheet 2.

W. H. FIELD.

Nail-Plate Feeder.

No. 8,556. Reissued Jan. 28, 1879.

Witnesses.
Fred. G. Dutenich
Jno. P. Brooks.

Inventor
Wm. H. Field,
pr: C. A. Snow & Co
attorneys

N. PETERS, PHOTO-LITHOGRAPHER, WASHINGTON, D. C.

W. H. FIELD.
Nail-Plate Feeder.
No. 8,556. Reissued Jan. 28, 1879.
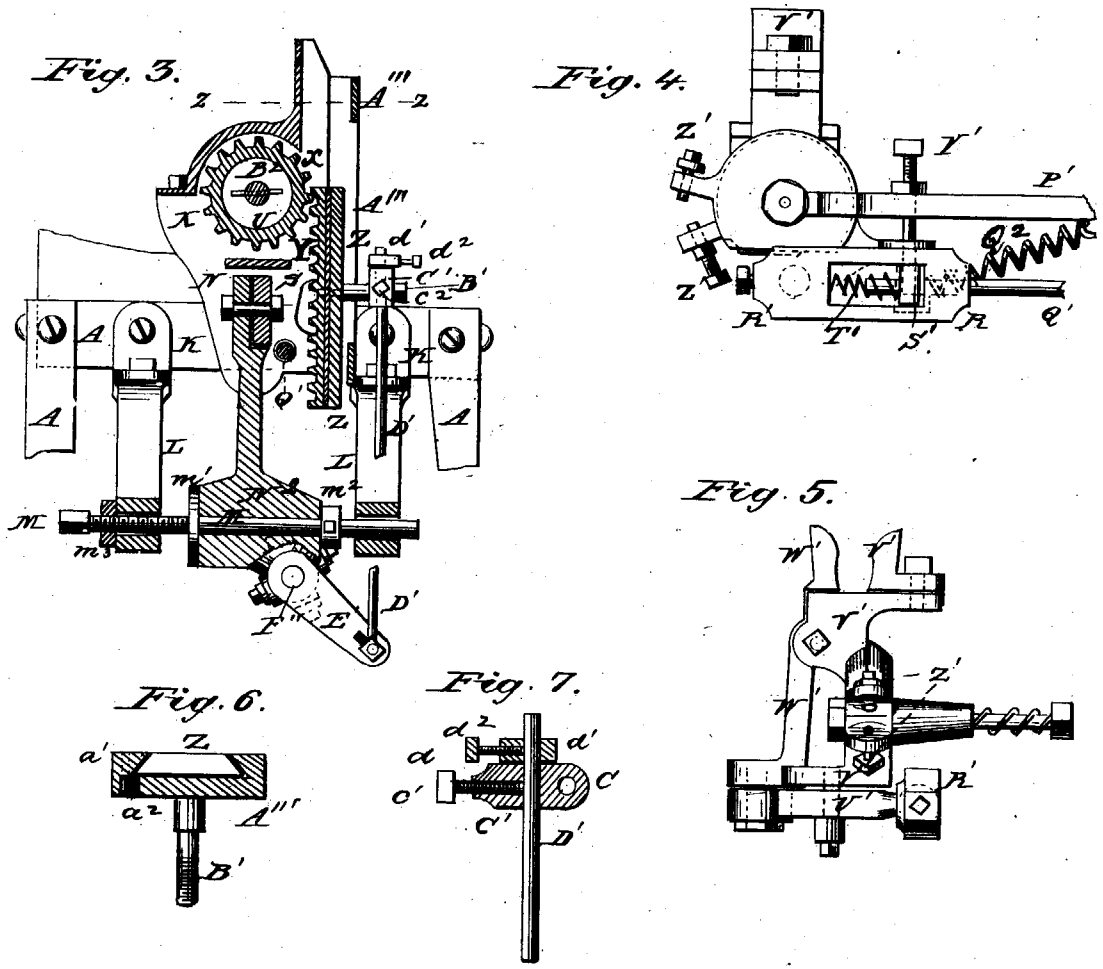
Witnesses
Fred G. Dieterich
Jno. P. Brooks
Inventor
Wm. H. Field,
pr: C. A. Snow & Co.
Attorneys.
N. PETERS, PHOTO-LITHOGRAPHER, WASHINGTON, D. C.

UNITED STATES PATENT OFFICE.

WILLIAM H. FIELD, OF TAUNTON, MASSACHUSETTS.

IMPROVEMENT IN NAIL-PLATE FEEDERS.

Specification forming part of Letters Patent No. 197,547, dated November 27, 1877; Reissue No. 8,556, dated January 28, 1879; application filed April 11, 1878.

*To all whom it may concern:*

Be it known that I, WILLIAM H. FIELD, of Taunton, in the county of Bristol and State of Massachusetts, have invented certain new and useful Improvements in Nail-Plate Feeders; and I do hereby declare that the following is a full, clear, and exact description of the invention, that will enable others skilled in the art to which it appertains to make and use the same, reference being had to the accompanying drawings, and to the letters of reference marked thereon, which form a part of this specification.

This invention relates to automatic nail-plate feeding devices, or the mechanism by which the nail-plates are fed automatically to the cutters of a nail-machine; and it consists in certain improvements upon the nail-plate feeder for which Letters Patent of the United States No. 171,005 were granted to me on the 14th day of December, 1875, the said improvements having for their object to make this machine more convenient in use, more reliable and accurate in operation, and less liable to get out of order or require adjustment.

Figure 1:
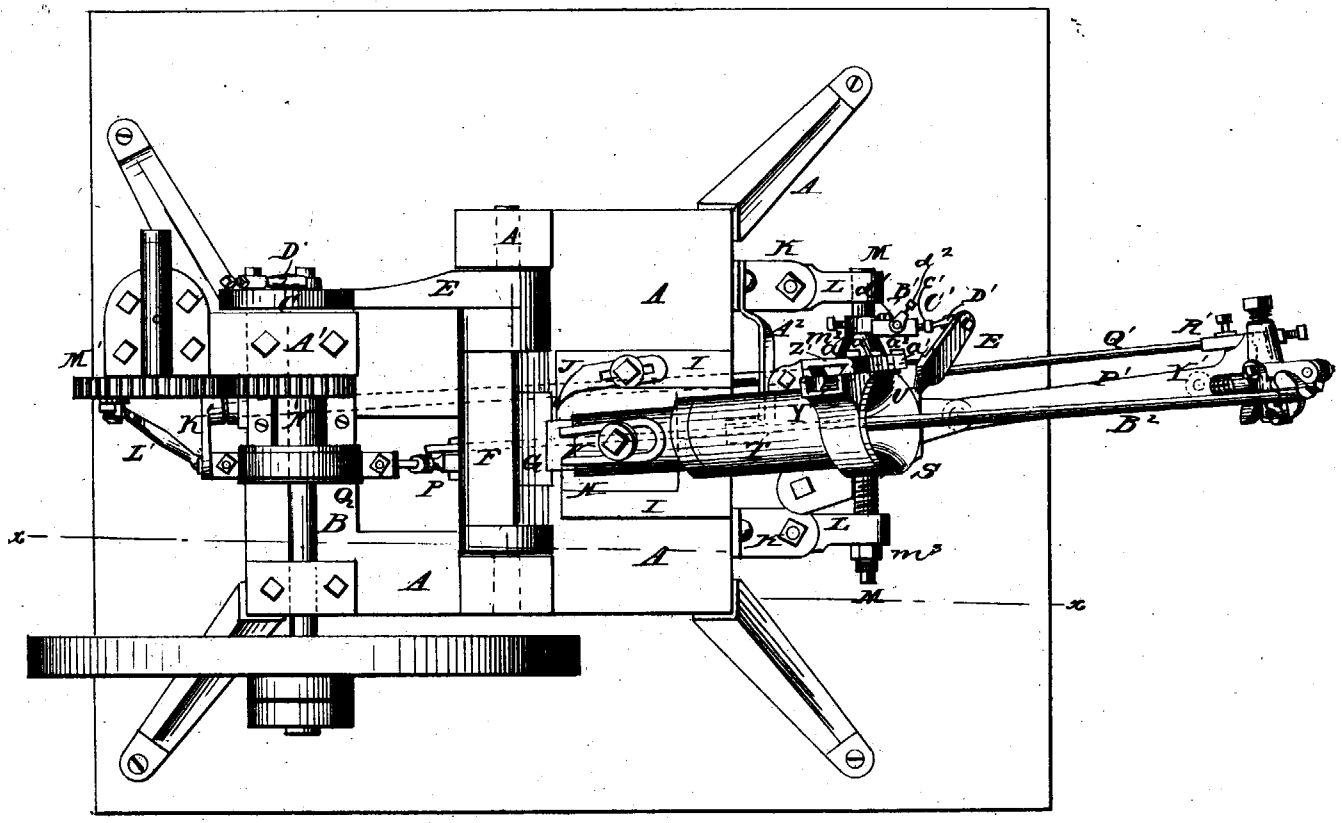
Figure 2:
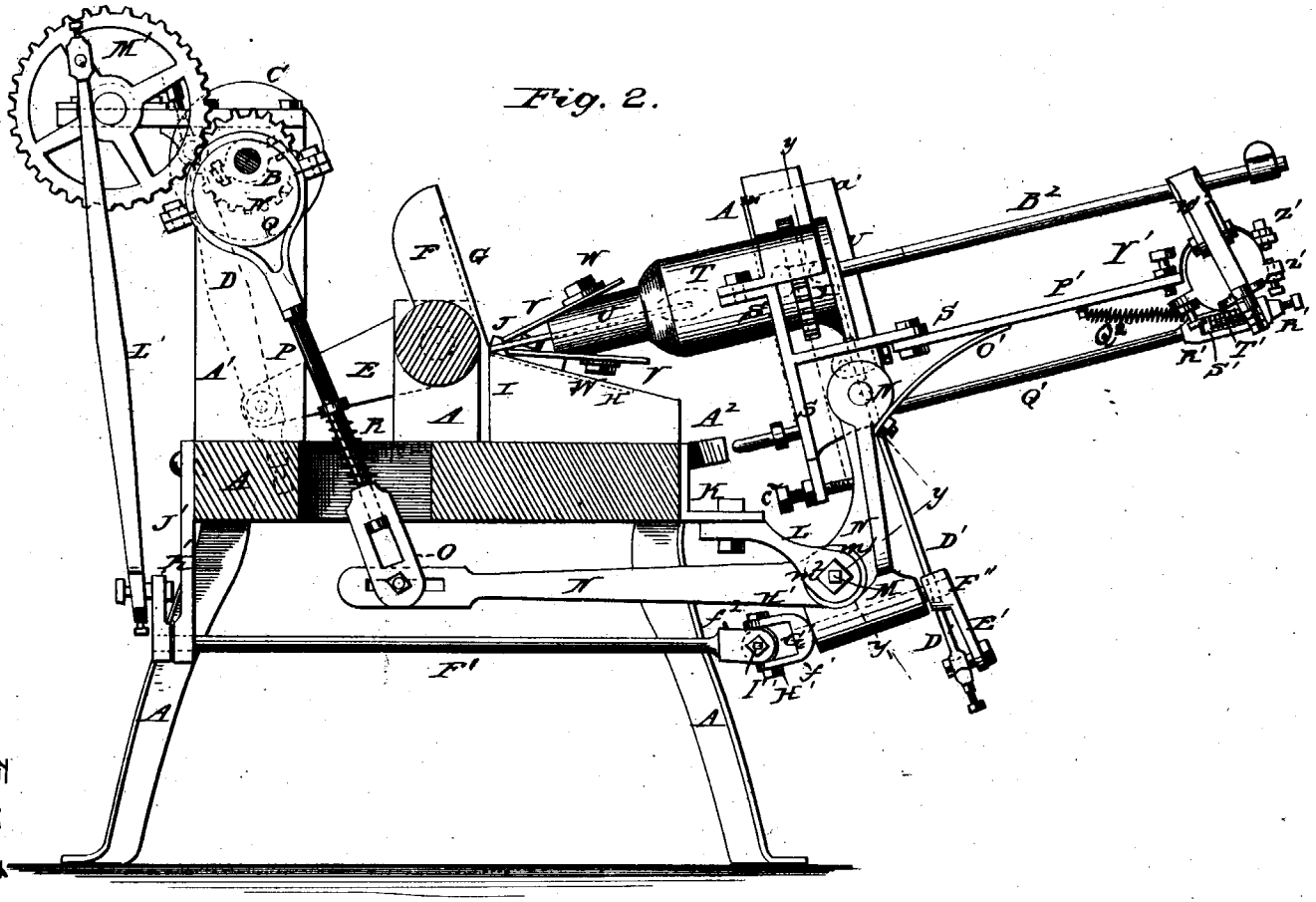

On the three sheets of drawings hereto annexed, Figure 1 is a top view of a portion of a nail-machine having my improved feeder applied. Fig. 2 is a vertical longitudinal section of the same, taken through the line *x x*, Fig. 1. Fig. 3 is a cross-section of my improved feeder, taken through the broken line *y y y*, Fig. 2. Fig. 4 is a detail side view of the rear part of the feeder. Fig. 5 is an extreme rear view of the same. Fig. 6 is a cross-section, taken through the line *z z*, Fig. 3, and Fig. 7 is a detail section, of the turning-rod attachment.

Similar letters of reference indicate corresponding parts in all the drawings.

A represents the frame of the machine, which may be of any suitable construction, and carries uprights or bearings $A^1$, one on each side, in which the driving-shaft B is journaled. The motive power is applied to one end of this shaft, while to its other end is keyed a crank-wheel, C, to the crank-pin of which the upper end of a connecting-rod, D, is pivoted. The lower end of rod D is pivoted to the crank-arm E, attached to the holder F of the movable cutter G, between which and the stationary cutter H the plates are cut into nails. The stationary cutter H is preferably attached to a holder, I, which is secured to the table or bed-plate A of the machine. J is a gage or stop, attached to the holder I, for the purpose of regulating the position of the nail-plate.

To the front of the bed-plate A are bolted the upper vertical arms of the right-angled knees K, which are adjustable vertically, and have bolted to the under side of their projecting horizontal arms the ends of the adjustable brackets L, which are slotted longitudinally with the length of the machine to receive the bolts, so that the feeder may be moved toward or from the machine, and secured in any given position by tightening down the nuts upon the bolts.

The feeder may be adjusted laterally in a similar manner by means of transverse slots in the upper vertical arms of the knees K, which slide upon bolts projecting from the bed-plate A, so that a double adjustment of the feeder in relation to the machine is possible—viz., a longitudinal motion, or motion in a line with the length of the machine, and a lateral motion, or motion transversely across the front end of the machine, for the purpose of adjusting the feeder with reference to the gage or stop J.

Besides this lateral adjustment of the feeder, by means of the slotted knees K, the shaft which carries the rock-lever N, by which the feeder proper is supported and operated, is so constructed as to admit of the lateral adjustment of this lever without stopping the operation of the machine. Lever N consists of two arms, set at about a right angle to each other, and a hub or perforated head, $N^2$, at the point where the arms unite. Through this hub passes a shaft, M, which is provided with a stationary collar, $m^1$, upon one side of the hub or head $N^2$, and a movable collar, $m^2$, secured by a set-screw upon the other side of the hub. In this manner the hub carrying the lever N is confined between the collars $m^1$ $m^2$, and rocks freely upon the shaft M.

It is obvious that instead of the movable collar $m^2$, a check-nut or equivalent device for confining the lateral motion of the hub upon the shaft may, if preferred, be employed without deviating from the spirit of my improvement. In either case the shaft M passes loosely through one of the brackets L, and has a screw-thread formed upon its other end, which is screwed into the screw-threaded perforation of the opposite arm L, and secured in place by a lock-nut, $m^3$.

It follows that the hub carrying the bell-crank or lever N may be adjusted laterally by turning shaft M, so as to change its bearings in relation to the arms L L, and consequently the machine, and this adjustment may be effected while the machine is in full operation. For the purpose of facilitating turning of the shaft M, its screw-threaded end is squared off to fit it to receive a wrench or key.

The end of the lower or long arm of the lever N is slotted longitudinally to receive the pin by which it is pivoted to the socket O, which is also slotted longitudinally to receive the nut into which the end of the crank-rod P is screwed. The upper end of this rod is connected by a strap to an eccentric, Q, upon the driving-shaft B, so that when the machine is in motion the angle-lever N is rocked or vibrated upon shaft M.

In order to prevent breakage of or injury to the machine by sudden stoppage, caused by the feeder meeting an obstruction, or from other causes, I provide the lower part of the connecting-rod P with a spiral spring, R, the lower end of which rests against the upper shoulder of the slotted socket O, while its upper end abuts upon a collar or annular shoulder secured upon or forming a part of rod P. This spring is made of such a strength as to hold the rod P and socket O extended under normal conditions or ordinary circumstances; but should the feeder meet an obstruction spring R will yield, and allow rod P to be pushed down into the slot of socket O, thus forming a yielding or elastic joint or coupling between rod P and the rock-lever N, which will allow of the continued revolution of the drive-shaft B and eccentric Q without breakage until the machine can be conveniently stopped.

Upon the upper or short arm of lever N is formed a circular head, to which is pivoted the circular lug formed upon the outer side of the lower arm of the bracket S. To the upper arm of this bracket is secured a sleeve, T, in which works the barrel U. The forward end of this barrel is flattened upon a taper, so as to guide the nail-plate into proper position to be cut, whatever may be its position when inserted in the other end of the barrel.

The springs V, attached to the front end of the barrel U by bolts and washers, are designed to hold the nail-plate firmly in place during the operation of cutting the nails, and prevent it from being drawn back by the rearward movement of the feeding device.

Upon the rear end of the barrel U is formed a gear-wheel, X, into the teeth of which mesh the teeth of a vertical rack, Y. This rack is secured upon a plate, Z, by screws, or in any other suitable manner, to enable a packing to be inserted between rack Y and plate Z, as may be required to take up the wear and secure even and accurate motion of the gear-wheel X and barrel U. The edges of plate Z are beveled, as shown in Fig. 6, to enable it to fit into a dovetailed vertical recess, in which it slides, and which is formed by a plate, A‴, and a gib, $a^1$, attached to one side of plate A‴ by screws $a^2$, which pass through slots in the plate A‴, so as to allow the gib $a^1$ to be tightened up against the beveled side of sliding rack-plate Z, and thereby take up wear and prevent lateral play of the plate. To the back of this is secured a stud or bolt, B′, which passes out through a longitudinal slot in plate A‴, and has pivoted upon its end the coupling-sleeve $C^1$, in which, at right angles with the hole for the pin or stud B′, is formed a vertical perforation to receive the connecting-rod D′, which may be adjusted in this perforation by means of a set-screw, $c'$. (See Fig. 7.) $d^1$ is a collar placed upon rod D′, above the coupling $C^1$, and secured in place by a set-screw, $d^2$, as shown.

By this construction and combination of the coupling and connecting-rod, the operation of the rack-plate Z, rack Y, and barrel U may be stopped without stopping the machine by simply loosening the set-screw $c'$, so as to allow rod D′ to work loose in its perforation in the coupling $C^1$. This allows of the feeder being tipped back, so as to afford convenient access to the knives or cutters of the nail-machine, as the barrel U will remain still while the operator is adjusting the cutters. Another advantage is that the stroke of rod D′ may be regulated by adjusting the collar $d^1$ upon the rod, which admits of readjustment of rod D′ in its relation to the pin or bolt $B^1$ after uncoupling by loosening the set-screw $c'$, by simply shoving the coupling up against the collar, and then securing it in position by tightening the set-screw $c'$, so that the stroke of rod D′ will always be of the same length after each uncoupling for the purpose of adjusting the cutters, or for other purposes.

The lower end of the connecting-rod D′ is pivoted to the crank E′, which is attached to the forward end of a short shaft, F″, that rests in a box cast upon, and in one piece with, the hub of lever N. Upon the inner end of shaft F″ is formed a fork, $f^1$, within which is placed a ball, G′. The ball G′ is secured in place by set-screws H′, which pass through screw-holes in the arms of the fork $f^1$, and their ends enter recesses in the opposite side of the said ball G′.

In the opposite sides of the ball G′ are formed recesses at right angles with the other two recesses, to receive the ends of the set-screws I′, which pass through screw-holes in the arms of the fork $f^2$, formed upon the inner end of the connecting-shaft F′. The set-screws H′ I′ are provided with jam-nuts, to prevent them from working loose. The outer end of the connecting-shaft F′ revolves in bearings in a hanger, J′, attached to the frame A, and terminates in a crank, K′, which is slotted to receive the crank-pin, so that the throw of the crank may be adjusted as required.

To the pin of the crank K′ is pivoted the lower end of the connecting-rod L′, the upper end of which is pivoted to the crank-pin attached to the gear-wheel M′, the journal of which revolves in bearings projecting from the standards $A^1$ of frame A, while its teeth mesh into the teeth of the small gear $N^1$, attached to the driving-shaft B.

By this arrangement and combination of parts the revolutions of the driving-shaft B will rock the lever N and barrel U, and reverse the nail-plate as each nail is cut.

The barrel U and the bracket S are held in working position by a spring, O′, which presses against the under side of the rearwardly-projecting arm of the bracket S, or of a bar, P′, attached to said arm by a bolt.

The spring O′ is pivoted to the upper arm of the lever N in such a way that it may be swung to one side, to allow the barrel U and the bracket S to be turned back to give convenient access to the cutters G H. The spring O′ allows the barrel U to give, should an obstruction occur, and thus prevents breakage.

$Q^1$ is a rod which slides in a hole in a guide-lug attached to, or formed upon, the side of the bracket S. The outer end of the rod $Q^1$ passes into a hole in the end of the socket-block R′, which is slotted to receive the collar S′ and its set-screw, by which the rod $Q^1$ is kept from being drawn out of the said block, and to receive the spiral spring T′, placed upon the end of the rod $Q^1$, with one end resting against the collar S′ and its other end resting against the block R′, at the outer end of its slot.

To the side of the outer end of the socket-block R′, or in a socket formed in said end, is pivoted the end of a short lever, U′, which is pivoted to the lower part of the jaw V′ of the clamp. The other end of the lever U′ is beveled off or made cam-shaped, so as to strike against a friction-roller pivoted to the lower end of the other jaw, W′, of the clamp, to move the upper end or face of said jaw W′ toward the upper end or face of the jaw V′. The jaw W′ is pivoted to the jaw V′, so that its upper end may be moved toward and from the upper end of the said jaw V′. This jaw is pivoted to the end of the bar or arm P′, so that the upper ends of the two jaws V′ W′ may be moved toward and from the machine; and both jaws V′ W′ are drawn back by the spiral spring $Q^2$, one end of which is attached to the bar or arm P′, and its other end to the lower end of the jaw V′, or to an arm attached to said end.

The rearward movement of the jaws V′ W′ of the clamp is limited by a set-screw, Y′, which passes through a hole in the bar or arm P′, so that its forward end may be struck by an arm formed upon the lower part of the jaw V′. On the other hand, the forward movement of the jaws V′ W′ of the clamp is limited by the set-screws Z′, one of which passes through a lug formed upon the end of the bar or arm P′, and the other through a lug formed upon the jaw V′, the said lugs being so formed that the ends of the said screws may strike against each other.

By this construction and combination of parts, it will be observed that, as the barrel U is carried forward by the rocking movement of the lever N upon its shaft M, the inner end of the rod $Q^1$ will strike the spring $A^2$, attached to the frame A or some other suitable support, and is pushed outward. The first effect of the outward movement of the rod $Q^1$ is to force the cam end of lever U′ against the friction-roller of the jaw W′, which causes the said jaw to clamp the nipper-rod $B^2$ against the other jaw, V′. As the rod $Q^1$ continues to move outward, the clamp V′ W′ is turned inward upon its pivot, which forces the nail-plate forward in the barrel U for a distance equal to the required breadth of a nail.

The spring $Q^2$ is made of such a strength as to resist the rod $Q^1$ until the clamp V′ W′ has moved forward and the set-screws Z′ have come in contact, and will then yield as the barrel U continues to move forward to complete its stroke. Spring $A^2$ thus takes up the wear, so that the machine can be used a long time without readjusting the rod $Q^1$. As the barrel U moves outward, the rod $Q^1$ is withdrawn from the spring $A^2$, which releases the clamp V′ W′ and allows the nipper-rod to be turned with the barrel U, and at the same time the spring $Q^2$ draws the clamp V′ W′ back into position to again grasp the nipper-rod $B^2$ and carry it forward. The nipper-rod $B^2$ has a clamp or nipper attached to its forward end to grasp and hold the nail-plate.

$C^2$ is a set-screw, which passes through a screw-hole in the lower arm of the bracket S and rests against the upper arm of the lever N, to enable the barrel U and U-springs V to compensate for any little variation in the thickness of the cutters G H when changed.

I am aware that it is not new to use two springs on each side of the barrel; but these upper springs require grooves in the barrel to guide them, said grooves weakening the barrel and causing it to break at the end, as well as allowing the butt or waste end of the nail-plate to catch in it; also, (there being two springs on each side of the barrel,) when the ends are worn, so as to require adjustment, it is very difficult to set the springs correspondingly.

The subject-matter of claims 1, 3, 4, and 5 has been patented to me in Great Britain under No. 4,522 of 1876, which is previous to my application in the United States.

Having thus described my invention, I claim as new and desire to secure by Letters Patent of the United States—

1. The combination of the vertical rock-lever N N N, having journal-box N″, with the coupling-rod F′, shaft F″, and connecting-rod D′, substantially as and for the purpose hereinbefore set forth.

2. The combination of the vertically-sliding rack-plate Z, having stud $B^1$, adjustable coupling $C^1$, having one transverse, one vertical, and one longitudinal horizontal perforation for the insertion of stud $B^1$, rod $D'$, and set-screw $c'$, respectively, and connecting-rod $D'$, having adjustable collar $d^1$, substantially as and for the purpose hereinbefore set forth.

3. The combination, with the barrel-bracket, of the rock-lever N N N and spring $O'$, the latter pivoted to the arm of the former, so as to admit of its lateral movement, substantially as and for the purpose hereinbefore set forth.

4. In a nail-plate feeder, the spring V, constructed in the form of a staple, substantially as and for the purpose hereinbefore set forth.

5. The combination of the rod $Q^1$, the cam-lever $U'$, the spiral spring $Q^2$, the set-screw $Y'$, the two set-screws $Z'$, and the spring $A^2$ with the jaws $V'$ $W'$ and the bar $P'$, substantially as and for the purpose hereinbefore set forth.

In testimony that I claim the foregoing I have hereunto set my hand.

WILLIAM H. FIELD.

Witnesses:

J. F. BARRETT,

JAMES H. DEAN.